Nov. 8, 1932.  H. B. GLASE  1,887,092
AGRICULTURAL DEVICE
Filed March 9, 1932
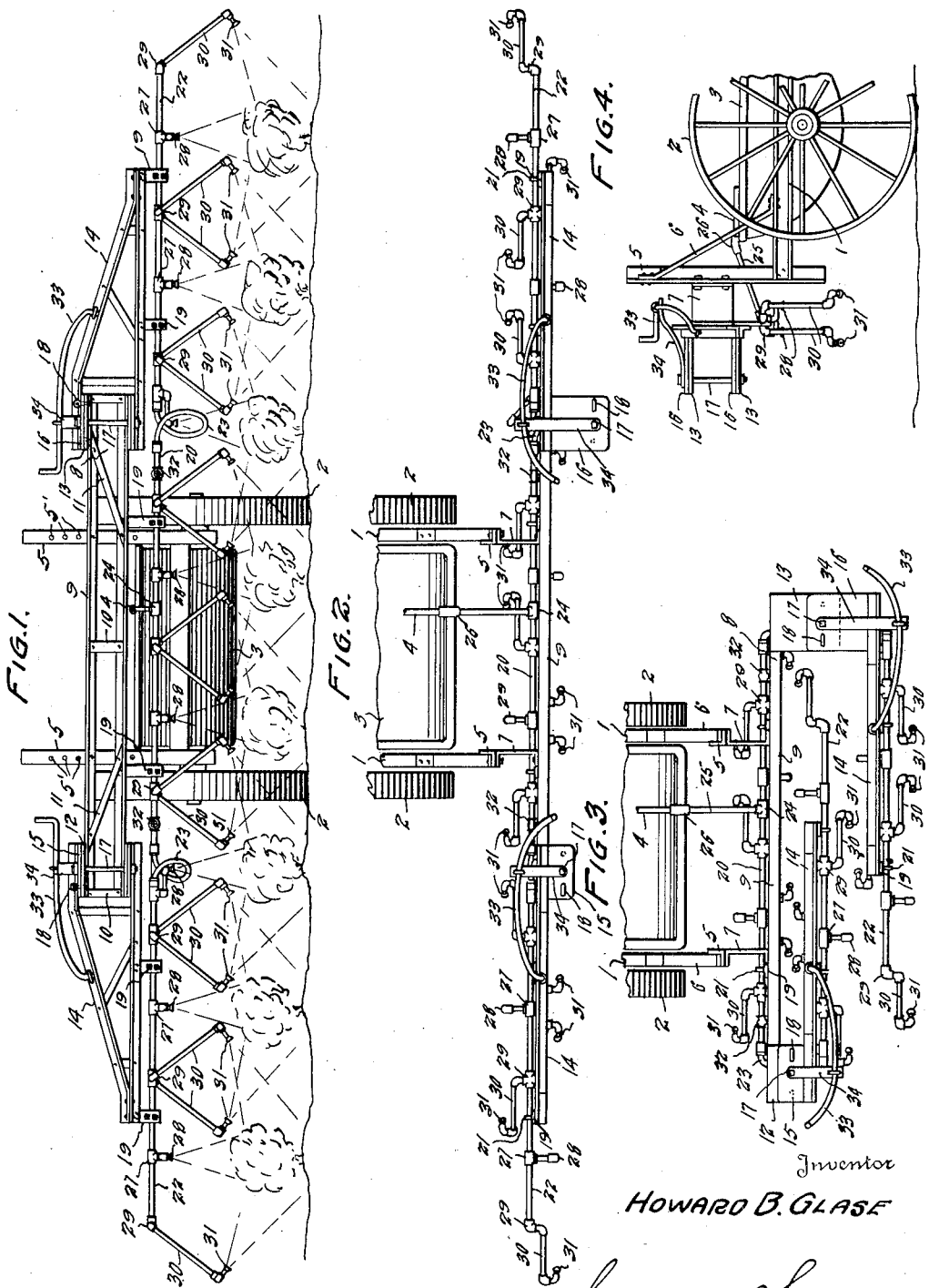
Inventor
HOWARD B. GLASE
By Semmes & Semmes
Attorneys Patented Nov. 8, 1932

1,887,092

UNITED STATES PATENT OFFICE

HOWARD B. GLASE, OF DANIELSVILLE, PENNSYLVANIA

AGRICULTURAL DEVICE

Application filed March 9, 1932. Serial No. 597,825.

This invention relates in general to agricultural machinery, and more particularly has reference to machines for spraying fluids on vegetation, the plants of which are positioned in spaced apart rows.

It has long been known that in order to successfully and economically produce vegetables and other commodities of an agricultural nature, it is necessary to overcome the disadvantageous results produced by insects and plant parasites. The insects which attack plants are of many varieties, and sometimes are so effective that entire crops will be lost or seriously impaired. In such instances, the market value of the produce is reduced to a minimum. Solutions of various substances capable of killing these insects or in rendering the plants inedible to the insects have been discovered and have been applied to the plants in various manners. One of the outstanding and most successful methods of applying the poisonous substances to the plants, is by atomizing the solution of the poison compound and spraying the clouds of atomized solution onto the entire plants.

Such spray devices have been mounted upon vehicles which are moved between the rows of the plants to be sprayed so that one or more rows of the plants can be treated simultaneously. It is, of course, desirable to effect the treatment of as many rows of the plants at one time as is practically possible. Machines have been built, therefore, which will spray quite a number of rows of the plants at one time. It is obvious that if a machine is constructed to spray a plurality of rows of the plants at one time, such a machine must of necessity be rather large and bulky. Such machines of extensive breadth are difficult to handle, especially when moving the same over roads, such as public highways. Machines of this type also require large storage spaces. In machines of this construction, the body of the machines may be constructed so as to correspond to the standard width farm vehicle, but when constructed to effect the spraying of a plurality of rows of plants, the boom must be rather extensive in width.

By so constructing the booms of the spray machines that the boom may be reduced to a fraction of its normal operating width, the machine may be moved over standard public highways without hindering the flow of traffic over these highways.

A primary object of this invention is to devise an agricultural spraying machine in which the spray boom may be folded so as to reduce the width of said boom.

Another object of this invention is to provide a spray machine in which the boom carrying the spray heads is constructed in sections, certain of which may be folded upon the others to reduce the extended width of the boom.

Yet another object of this invention is to construct an agricultural spray machine in which the boom carrying the spray heads is formed of a main section having extensions attached to the extremities thereof, which extensions are adapted to fold upon the main beam so as to lie substantially parallel thereto when in a folded position.

Still another object of this invention is to provide an agricultural spray machine in which a main boom carrying the spray heads is provided and in which extension booms are mounted on the extremities of the main boom so as to swing in a horizontal plane when folded onto the main boom.

A still further object of this invention is to provide an agricultural spray machine comprising a carriage having a main spray head support mounted thereon transversely thereof, and a plurality of extension spray head supports attached to the extremities of the main support by a hinge having a vertical pintle, said extension supports being so attached to the main support as to lie in the same vertical plane when extended, and to lie in parallel vertical planes when folded to their nonextended positions.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

The present invention as hereinbefore intimated, comprises a spray machine suitable for spraying solutions capable of destroying plant attacking insects and/or for protecting plants against blight. The machine consists essentially of a carriage having mounted thereon a tank adapted to contain a supply of the insecticide and a boom adapted to support a plurality of spray heads which are supplied with the insecticide from the supply tank. The boom for supporting the spray heads is preferably formed of three sections, one a main or central section which is adjustably mounted upon the carriage, and two or more extension sections attached to the extremities of the main section and adapted to extend the effective length of the boom or to be folded thereon so as to reduce the effective length of the boom. The extension supports are so mounted on the extremities of the main support that the extension supports will be swung in a horizontal plane when being moved from the extended to the folded position or vice versa. The connections between the extension support booms and the main boom are so constructed that all of the extended sections will lie in vertical planes which are parallel to the vertical plane in which the main support boom lies when the extensions are in the folded position.

In order to make my invention more clearly understood, I have shown in the accompanying drawing, means for carrying the same into practical effect, without limiting the improvements in their useful applications to the particular constructions, which for the purpose of explanation, have been made the subject of illustration.

In the drawing:

Figure 1 is a rear elevational view of an agricultural spray machine constructed in accordance with the present invention.

Figure 2 is a plan view of the machine shown in Figure 1, showing in detail the construction of the spray head support boom.

Figure 3 is a view similar to Figure 2, but different therefrom in that the extension booms are folded upon the main boom to reduce the effective length thereof.

Figure 4 is a side elevational view of the apparatus shown in Figures 1 and 2.

An apparatus constructed in accordance with the present invention has been clearly shown in the accompanying drawing. For purposes of illustrating the practical application of the invention, improvements forming the subject matter of the present invention have been shown applied to an ordinary power fluid spraying machine. As shown in the drawing, the spraying machine comprises a chassis 1 mounted on ground wheels 2. The diameter and tread of the wheels 2 may, of course, be varied to meet the requirements of the conditions under which the machine is to be used. Since the present invention involves the mounting of the fluid distributing means on the spraying machine, only the portion of the machine on which the spray element supports are mounted has been shown. The vehicle carrying the spray mechanism may be either of the two wheel or sulky type, or it may be mounted on more than two wheels.

It is, of course, within the concept of the present invention to apply the improvements herein described to agricultural spray machines of the self propelled type, or to the type which are drawn by horses or tractors.

A reservoir or receptacle 3 for the solution to be sprayed, is carried by the chassis 1 and may be attached thereto in any suitable manner. The liquid in the tank 3 is discharged therefrom through the discharge conduit 4. Any of the conventional types of pumps suitable for forcing the liquid solution from the discharge conduit may be associated with the reservoir 3. Power for operating the pump may be obtained by movement of the machine over the ground or from a power source, (not shown), carried by the spraying machine. In some instances, the flow of the solution from the reservoir may be effected by gravity.

A pair of vertical standards 5 are attached to the rear end of the chassis frame 1 by rivets or other effective securing means. As shown in the drawing, the chassis frame 1 is formed of channel beams and the vertical standards are formed of angle irons. Braces 6 serve to maintain the standards in fixed position relative to the chassis frame 1.

Adjustably attached to the standards 5 are channel shaped brackets 7 which are fixed to the spraying element support frame 8. As clearly shown in Figure 1 of the drawing, vertical standards 5 are provided with a plurality of vertically spaced apertures or bolt holes 5', through which extend the means for attaching the bracket 7 to the standards 5. It will be appreciated in view of this construction, that the distance of the spray element support frame 8, which is carried by the brackets 7, from the ground, may be varied to meet the variations in the growth of the plants to be sprayed.

As hereinbefore pointed out, the present invention provides a spraying machine in which the spray boom is formed in sections which may be moved to vary the effective width of the spraying machine. As shown in the drawing, the spray element support frame 8 consists of a central or main section 9 which is directly attached to the bracket 7. This frame may be of any desired construction, and as shown in the drawing, is formed of a pair of vertically spaced angle irons having a plurality of spacing members 10 extending between the same. In addition to the spacing elements 10, braces 11 extend between the upper and lower angle iron sections and serve to maintain the rigidity of the frame.

Adjacent each end of the central or main spray element support frame, are mounted a pair of plates 12 and 13. It will be noted that at each end, one plate is attached to the upper angle iron and the other plate is attached to the lower angle iron. These plates serve as hinge elements which will be described more in detail hereinafter. On each end of the main or central frame 9, there is pivotally mounted an extension frame 14. The extension frames are formed of angle iron sections, and as shown in Figure 1 of the drawing, may be substantially triangular in shape. The triangular shaped spray element supports are attached to the main or central spray element support 9 by means of plates 15 and 16 which cooperatee respectively with the plates 12 and 13, which are fixed to the upper and lower portions of the frame 9 adjacent the ends thereof. The plates 15 and 16 are secured to the upper and lower portions of the thrust frames 14. Each of the plates 12, 13, 15 and 16 is provided with an aperture through which extends a bolt or pintle 17, thereby forming a hinged connection between the plates 12 and 15 at one end of the frame 9, and the plates 13 and 16 at the other end of the frame 9. With this construction, it will be obvious that the extension frames 14 may be moved to the positions shown in Figures 1 and 2, or may be folded upon the main frame 9 as shown in Figure 3.

As clearly shown in Figures 1, 2 and 3 of the drawing, the upper plates carried by each of the extension segments 14, are provided with an opening adapted to register with openings carried in the upper plates mounted on the ends of the frame 9 when the frames 14 are in either the extended or the folded positions. An eye-bolt 18 is adapted to extend through the registering opening to maintain the frames 14 in either the extended or the folded position.

In Figures 2 and 3, it will be obvious that the plates 12 and 15 are considerably shorter than the plates 13 and 16. In other words, the pintle 17 extending through the plates 12 and 15 is much closer to the frames 9 and 14, than is the pintle 17 extending through the plates 13 and 16. This construction permits both of the extension sections 14 to be folded as shown in Figure 3, so that both sections will lie in a plane parallel to the plane in which the central or main frame 9 lies. This is advantageous in that the sections when folded are more compact than if both of the hinges formed by the plates 12 and 15, and 13 and 16, respectively, were of the same size.

Depending from the lower angle irons of the main frame 9 and the extension frames 14, are a plurality of pipe hangers 19. The main frame 9 has a section of pipe 20 constituting a spray element header supported therefrom by means of the pipe hangers 19. Suitable pipe straps 21 are employed to attach the header 20 to the pipe hangers 19. Each of the foldable extension sections 14 supports a spraying element supply pipe or header 22. The ends of the header 20 are connected with the headers 22 by means of the flexible connections 23.

A T-fitting 24 is provided in the header 20 and serves to connect the header by means of conduit 25 with the fluid discharge conduit 4 of the reservoir 3. A flexible connection 26 may serve to connect the conduit 25 with the discharge pipe 4, so as to permit vertical adjustment of the frame 9 on the standards 5.

The headers 20 and 22 are provided with a plurality of T-fittings 27 to which are attached spray elements 28. These spray elements are so positioned as to spray downwardly upon the plants undergoing treatment. In addition to the T-fittings 27, the headers are also provided with a plurality of horizontally positioned crosses 29. Extending from each side of the cross is a downwardly extending angularly positioned pipe section 30, carrying spray element 31. One of the spray elements connected to one cross 29 is adapted to spray the plants in one row, whereas the other spray element 31 connected to the same cross 29 is adapted to spray the plants in an adjacent row. The positioning of the spray elements 31 is clearly shown in Figure 1. Of course, the ends of the headers 22 are provided with downwardly extending angularly positioned elements 30 similar to those attached to the crosses 29 and having spray elements 31 at their extremities for spraying the outermost rows of the plants to be sprayed. Valves 32 are positioned adjacent each end of the header 20 whereby the flow of the spraying fluid to either of the headers 22 may be regulated or entirely shut off. This is advantageous in that when it is only necessary to spray a few rows of the material, the spraying fluid will not be discharged from all of the spray elements.

In order to facilitate the movement of the sections 14 about the pintle 17, actuating members 33 have been associated with the frames 14 and with the pintles 17 so as to effect the movement of the frames 14 about the pintle 17. As shown in the several figures of the drawing, straps 34 serve to connect the members 33 with the pintles 17.

As clearly shown in Fig. 1 the actuating elements 33 are provided at their ends with vertical extensions which are adapted to be gripped by the operator when he desires to move the sections 14 from one position to another. The vertical extensions on the elements 33 which serve as handles are located adjacent the driver's seat (not shown)

so that they are in reach of the driver. With this construction the driver may swing the section 14 from one position to another without dismounting.

It will be appreciated that the headers 22 may be adjusted longitudinally of the sections 4 so as to increase the effective width of the spraying machine. In some instances, it will be found that rows are planted further apart than normal. In this instance, it will be found necessary to slide the sections 22 outwardly so as to insure that the solution will be sprayed on the plants in the outermost rows.

From the foregoing description, it will be appreciated that I have provided a spraying machine in which the support frames for carrying the spraying elements may be extended to effect the spraying of a multiplicity of rows of plants and yet may be folded so that the machine may be handled easily, moved over standard highways, and stored in a minimum of space. By so constructing the extension frames that they are swung in a horizontal plane about a vertical pivot when moved from the folded to the extended positions, the extension frames may be adjusted upon a minimum of effort on the part of the operator. This is a decided advantage over the prior art type of spraying machine, in which the segments were lifted vertically to an inoperative position.

By so constructing the hinge elements which serve to connect the extension spray element supports with the main spray element support, that when in the folded position all of the spray element support frames will lie in parallel planes, a considerable less space will be taken up by the machine in folded form than in the case of a similar machine in which the sections would not lie in parallel planes. In this connection, it will be noted that the spray elements carried by the supporting frames interfit so that the frames lie very close together when in folded position.

A machine constructed in accordance with the present invention may be used for spraying various types of solutions on various plants. It has been found that the machine is particularly useful in spraying potato plants with a solution which will protect the plants against blight.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An agricultural spray machine comprising a carriage, a main spray head support mounted on the carriage transversely thereof, an extension spray head support attached to each end of the main support by a hinge having a vertical pintle, said extension supports lying in the same vertical plane when extended, the pintle in the hinge at one end being spaced from the supports a distance to permit one extension support to lie parallel to the main support when folded thereon, the pintle in the hinge at the other end being spaced a greater distance from the support to permit the other extension support to lie parallel to both the main and the extension supports when folded.

2. An agricultural spray machine comprising a carriage, vertical standards mounted thereon, a main spray head support vertically adjustably mounted on the standards and extending transversely of the carriage, an extension spray head support attached to each end of the main support by a hinge having a vertical pintle, the pintle in the hinge at one end being spaced from the supports a distance to permit one extension support to lie parallel to the main support when folded thereon, the pintle in the hinge at the other end being spaced a greater distance from the support to permit the other extension support to lie parallel to both the main and the one extension support when folded and means for locking the extension supports in the extended and folded positions.

3. An agricultural spray machine comprising a carriage, a main spray head support mounted on the carriage transversely thereof, an extension spray head support attached to each end of the main support by a hinge having a vertical pintle, said extension supports lying in the same vertical plane when extended and adapted to lie in vertical planes parallel to the vertical plane in which the main spray head support lies when folded, an actuating member associated with each extension spray head support and comprising a bar connected at one end to the extension spray head support, the other end of each bar being bent to form a handle and extending to a position adjacent the mid portion of the machine when the extension spray head supports are in their extended position, a link connecting each bar with the pintle of the extension spray head support adapted to be moved by the bar, to cause the extension spray head support to swing about its pintle when the bar is moved.

4. An agricultural spray machine comprising a carriage, a main spray head support mounted on the carriage transversely thereof, an extension spray head support attached to each end of the main support by a hinge having a vertical pintle, said extension supports lying in the same vertical plane when extended, the pintle in the hinge at one end being spaced from the supports a distance to permit one extension support to lie parallel to the main support when folded thereon, the pintle in the hinge at the other end being spaced a greater distance from the support to permit the other extension support to lie parallel to both the main and the extension supports when folded, and means extending to a point adjacent the mid portion of the machine for swinging the extension spray head support about their pintles.

In testimony whereof I affix my signature.

HOWARD B. GLASE.